(No Model.)
J. STORY.
GLASS BOTTLE STOPPER.
No. 291,637. Patented Jan. 8, 1884.
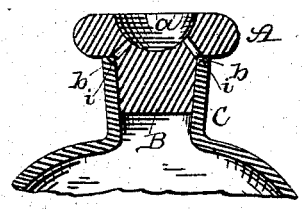
Witnesses.
Louis F. Gardner
J. W. Garner
Inventor.
John Story
per F. A. Lehmann
Atty.

United States Patent Office.

JOHN STORY, OF CASTLE SHANNON, PENNSYLVANIA.

GLASS BOTTLE-STOPPER.

SPECIFICATION forming part of Letters Patent No. 291,687, dated January 8, 1884.

Application filed July 9, 1883. (No model.)

*To all whom it may concern:*

Be it known that I, JOHN STORY, a citizen of the United States, residing at Castle Shannon, in the county of Allegheny and State of Pennsylvania, have invented certain new and useful Improvements in Glass Bottle-Stoppers, of which the following is a specification, reference being had therein to the accompanying drawing.

My invention relates to an improvement in glass bottle-stoppers; and it consists in an arrangement by which solvents can be made to enter between the stopper and the neck of a bottle, for the purpose of dissolving substances that rigidly hold the stopper in the neck, from which otherwise it cannot be removed without breakage; and it consists, also, in protecting the mouth of the bottle against dust.

The bottles generally used by druggists for holding liquids are closed by glass stoppers that enter into their necks, but offer no protection against dust that constantly settles on top of the neck and stopper. It becomes necessary, therefore, before pouring out any of the liquid, to first remove the dust from the mouth of the bottle, and afterward to wipe off any moisture that may adhere to the lip on the neck, especially when the substance contained in the bottle is of a resinous or gummy character. At the inside of the neck such substances adhere, and if the glass stopper be inserted a layer of adhesive substance becomes distributed around the stopper, which soon dries and hardens and rigidly holds the stopper in the neck. It is very difficult to remove the stopper when so confined, and breakage has often to be resorted to to gain access to the contents of the bottle. This difficulty I endeavor to overcome by removing the lip from around the neck and grinding its upper edge to be perfectly true for the flange of the stopper to rest upon. In the top of the stopper a basin is formed, from which conduits extend to the rim of the neck of the bottle, where the stopper enters the neck, so that a solvent, when poured into the basin, is led downward through the conduits and brought in contact with the hard matter that holds the stopper in the neck to dissolve it.

In order to protect the neck from the falling dust, the diameter of the handle is sufficiently enlarged to project over the neck of the bottle.

The accompanying drawing represents my invention in vertical section.

A represents flange of the stopper, and B the lower part, or stopper proper. The flange A is of sufficient thickness to admit the sinking of a basin or well, $a$, in its center from the top downward without interfering with the part B. The flange A, when the stopper is inserted in the neck of the bottle, rests upon the neck, and, being flat and ground underneath, its diameter exceeding that of the neck, excludes the dust. From the bottom of the well $a$ conduits $b$ lead to the inside of the rim of the neck to the point where the stopper is in contact with it. The neck C of the bottle, being adapted to the stopper, first by molding and afterward by grinding, is without the lip usually found on bottles of this kind.

Instead of the lip, the rim of the neck is ground flat, with a bevel, $i$, at its inside. This bevel forms around the stopper a circular cavity, $i$, into which the solvent is guided through the conduits $b$, and there stored until absorbed by the matter between the stopper and the neck of the bottle. As soon as the solvent has acted the stopper may be removed. The form of the part B is that of an inverted truncated cone ground in to the neck of the bottle, as usual.

This kind of stopper is chiefly intended for bottles containing adhesive substances, but may be used like other stoppers on all kinds of bottles holding fluids.

Having thus described my invention, I claim—

1. A glass bottle-stopper provided with the flange which extends out over the neck of the bottle, and which has a cavity or well formed in its top, and provided with conduits $b$, which communicate with the surface of the plug portion of the stopper, substantially as shown.

2. The combination of a bottle having the inner edge of the upper end of the neck cut away, so as to form a cavity, $i$, in combination with the stopper having a flange which projects outward over the neck of the bottle, and which stopper is provided with a cavity, $a$, and the conduits $b$, which communicate with the cavity $i$, which is formed by the cut-away edge of the bottle, substantially as specified.

In testimony whereof I affix my signature in presence of two witnesses.

JOHN STORY.

Witnesses:
 LOUIS MOESER,
 I. E. HIRSCH.